US008553403B2

(12) United States Patent
Chang et al.

(10) Patent No.: US 8,553,403 B2
(45) Date of Patent: Oct. 8, 2013

(54) FOLDABLE ELECTRONIC DEVICE WITH MAGNETIC LATCH

(75) Inventors: Yu-Lang Chang, New Taipei (TW);
Shih-Wei Chao, New Taipei (TW);
Cheng-Min Hung, New Taipei (TW);
Wei-Yu Wang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 272 days.

(21) Appl. No.: 13/206,530

(22) Filed: Aug. 10, 2011

(65) Prior Publication Data
US 2012/0307437 A1 Dec. 6, 2012

(30) Foreign Application Priority Data
May 30, 2011 (TW) .............................. 100118925 U

(51) Int. Cl.
*G06F 1/16* (2006.01)
(52) U.S. Cl.
USPC ................................... 361/679.2; 361/679.58
(58) Field of Classification Search
USPC ..................................................... 361/679.2
See application file for complete search history.

(56) References Cited

U.S. PATENT DOCUMENTS

| 6,351,372 | B1 * | 2/2002 | Kim ......................... 361/679.15 |
| 6,700,773 | B1 * | 3/2004 | Adriaansen et al. ...... 361/679.08 |
| 6,700,774 | B2 * | 3/2004 | Chien et al. ................ 361/679.2 |
| 6,976,799 | B2 * | 12/2005 | Kim et al. ...................... 400/472 |
| 7,221,562 | B2 * | 5/2007 | Song ......................... 361/679.06 |
| 2009/0239594 | A1 * | 9/2009 | Huang et al. ................ 455/575.1 |
| 2010/0007609 | A1 * | 1/2010 | Watabe et al. ................. 345/168 |
| 2010/0238620 | A1 * | 9/2010 | Fish ........................... 361/679.09 |
| 2011/0013347 | A1 * | 1/2011 | Kinjou ...................... 361/679.01 |
| 2011/0140934 | A1 * | 6/2011 | Ho ................................. 341/22 |

* cited by examiner

*Primary Examiner* — Lisa Lea Edmonds
(74) *Attorney, Agent, or Firm* — Altis & Wispro Law Group, Inc.

(57) ABSTRACT

An exemplary foldable electronic device includes a processing portion, a keyboard, and a latching member. The processing portion includes a main housing. The keyboard is rotatably connected to the processing portion. The keyboard includes a metal housing. The latching member is arranged in the main housing. The latching member includes a magnet. When the keyboard abuts against the processing portion, the attraction force between the magnet and the metal housing is greater than the force of the gravity acting on the keyboard, the keyboard is attached to the processing portion.

15 Claims, 6 Drawing Sheets

FOLDABLE ELECTRONIC DEVICE WITH MAGNETIC LATCH

BACKGROUND

1. Technical Field

The present disclosure relates to foldable electronic devices and, particularly, to a foldable electronic device with a keyboard.

2. Description of Related Art

A conventional tablet computer includes a touch screen for receiving input. However, a user may still need a keyboard for quick inputting in certain situations. An external keyboard may be used. However, if the external keyboard is not available, the user is inconvenienced.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure are now described in detail, with reference to the accompanying drawings.

Figure 1:
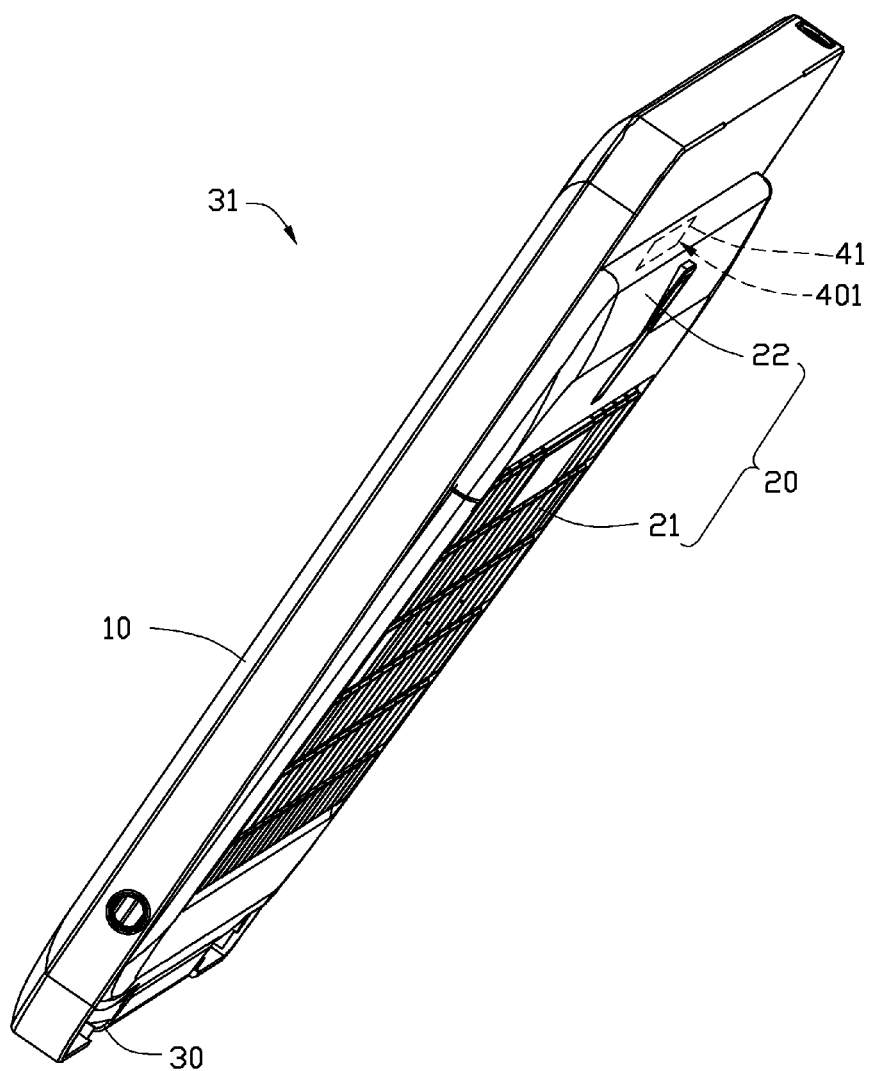
FIG. 1 is an isometric view of a foldable electronic device in accordance with a first embodiment.
Figure 2:
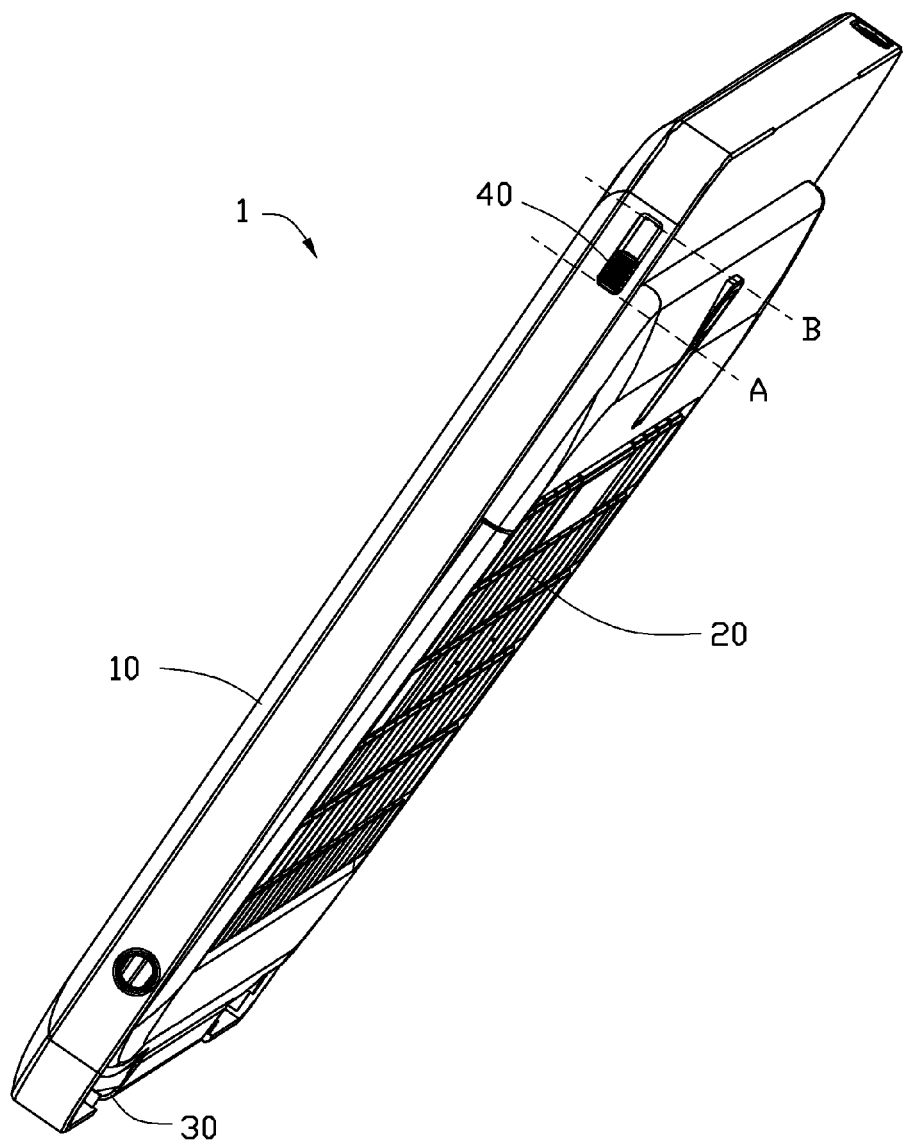
FIG. 2 is an isometric view of a foldable electronic device in accordance with a second embodiment, showing the foldable electronic device in a folded state.
Figure 3:
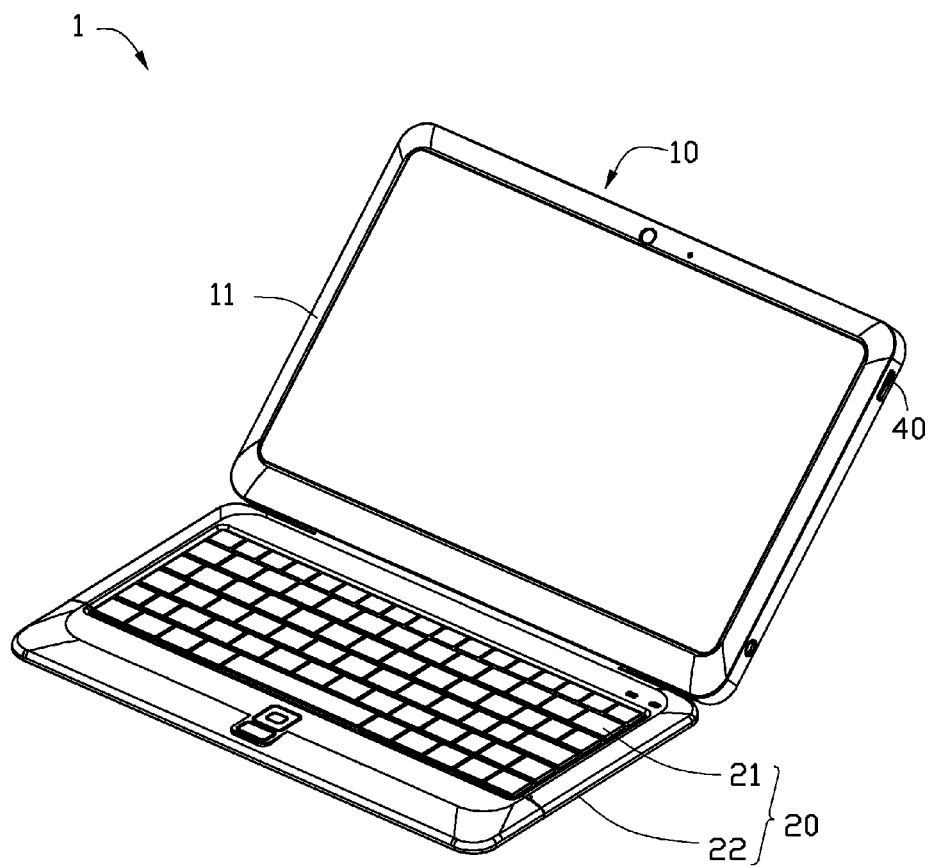
FIG. 3 is an isometric view of the foldable electronic device in accordance with the second embodiment, showing the foldable electronic device in an open state.

Referring to FIGS. 1-3, a foldable electronic device 31, 1 includes a processing portion 10, a keyboard 20, a friction hinge 30, and at least one latching member 401, 40. In the embodiment, there is only a single latching member 401, 40. One end of the keyboard 20 is rotatably connected to the processing portion 10 through the friction hinge 30. The latching member 401, 40 is attached to the processing portion 10. The keyboard 20 can be attached to the back of the processing portion 10 through the latching member 401, 40.

The processing portion 10 includes a main housing 11 to accommodate the required components, such as a processor, a hard drive, etc. The latching member 401, 40 is fixed to the main housing 11.

The keyboard 20 includes a number of keys 21 and a metal housing 22. In the embodiment, the width of the metal housing 22 is less than that of the main housing 11, and the length of the metal housing 22 is the same as that of the main housing 11.

The latching member 401, 40 includes a magnet 41. In the embodiment, the magnet 41 is a permanent magnet.

When the keyboard 20 is closed to the back of the processing portion 10, the attraction force between the magnet 41 and the metal housing 22 is greater than the force of gravity acting on the keyboard 20. The keyboard 20 can thus be attached to the back of the processing portion 10.

When the keyboard 20 is disengaged from the back of the processing portion 10, the keyboard 20 can then be rotated to a desired position, and can be maintained at the desired position by the friction provided by the hinge 30.

Referring to FIG. 1, in the first embodiment, the magnet 41 of the latching member 401 is fixed to the processing portion 10. In the embodiment, the magnet 41 is fixed to the back of the processing portion 10. No matter where exactly the magnet 41 is fixed on the processing portion 10, it is only when the keyboard 20 is closed to the back of the processing portion 10 that the attraction force between the magnet 41 and the metal housing 22 is greater than the force of gravity acting on the keyboard 20. When the keyboard 20 is in the position attached to the back of the processing portion 10, and sufficient force is manually applied to the keyboard 20 and the processing portion 10 by a user, the keyboard 20 can be pushed/pulled to disengage from the processing portion 10. In other words, the keyboard 20 and the processing portion 10 can be split away from each other by manual force that is sufficiently large to overcome the attraction force between the magnet 41 and the metal housing 22.

Figure 4:
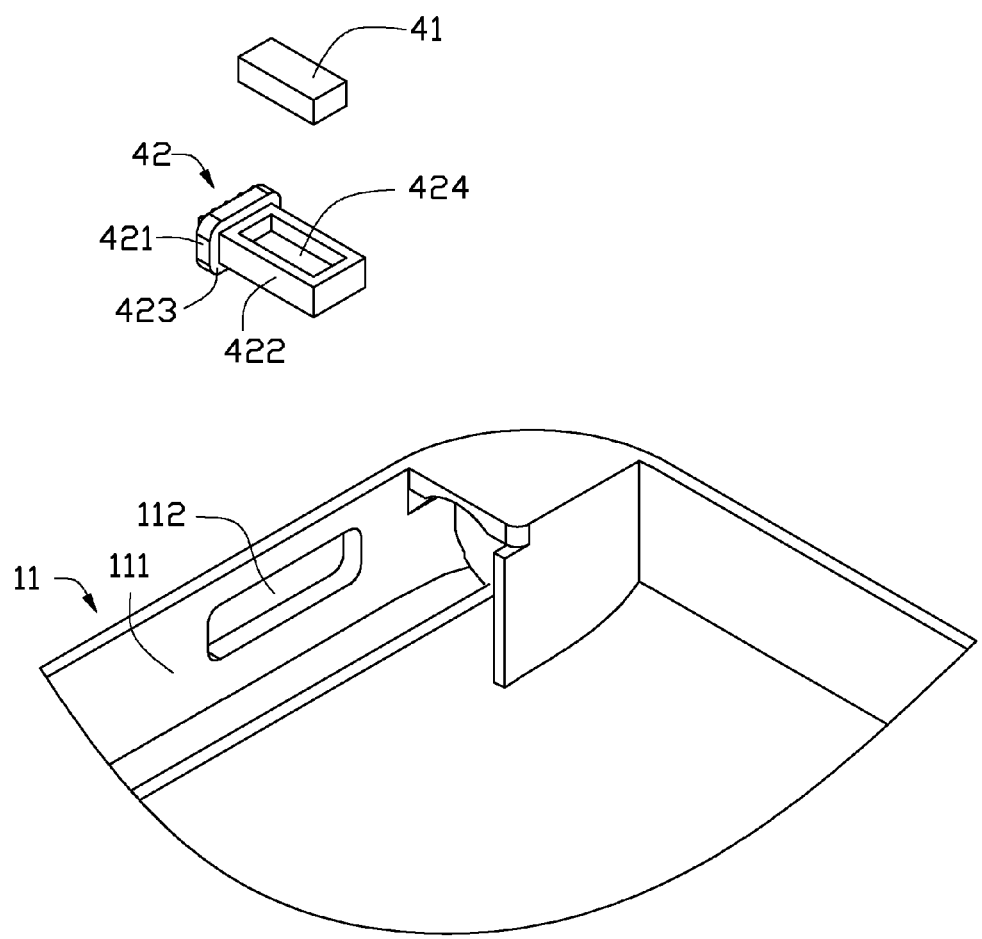
FIG. 4 is an enlarged, isometric, exploded view of part of the foldable electronic device of FIG. 3, corresponding to a top right corner of the foldable electronic device shown in FIG. 3.

Referring to FIGS. 2-4, in the second embodiment, a sidewall 111 of the main housing 11 defines at least one through slot 112. In the embodiment, there is only a single through slot 112 corresponding to the latching member 40. The latching member 40 is slidably received in the through slot 112.

The latching member 40 further includes a sliding member 42. The sliding member 42 includes a button 421 and a connecting member 422. The button 421 is located external to the through slot 112 of the main housing 11, for allowing manual operation by a user.

Figure 5:
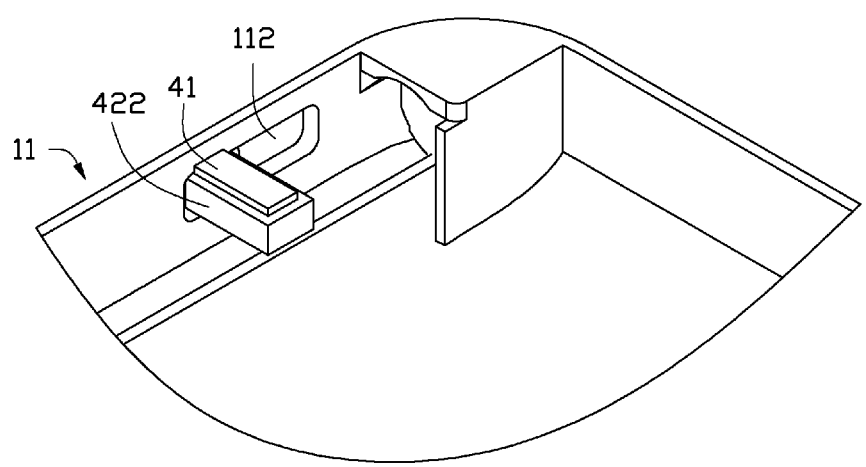
FIG. 5 is similar to FIG. 4, but showing the parts assembled, and showing a latching member of the foldable electronic device in a first position.
Figure 6:
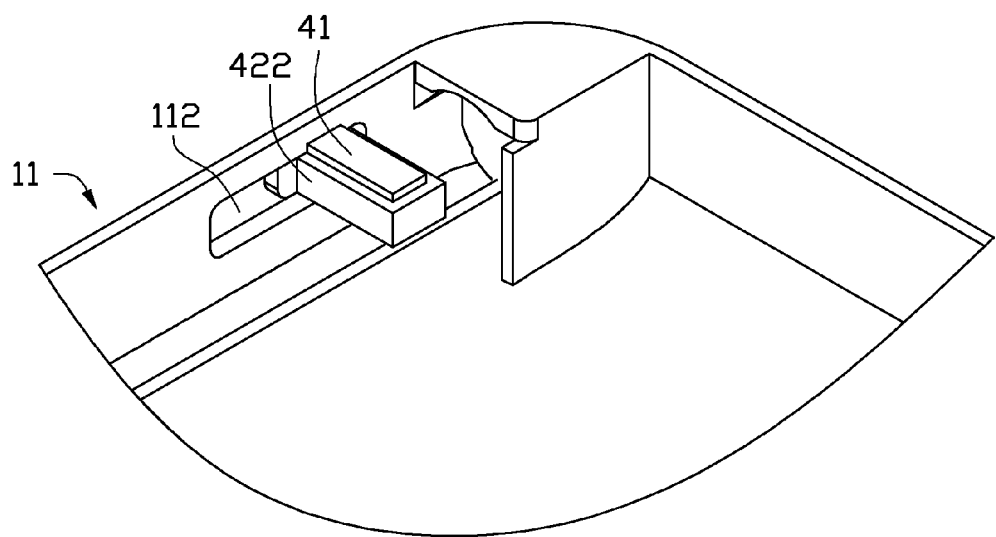
FIG. 6 is similar to FIG. 5, but showing the latching member of the foldable electronic device in a second position.

The connecting member 422 protrudes from a sidewall 423 of the button 421. The connecting member 422 extends through the through slot 112. The width of the connecting member 422 is less than the length of the through slot 112, thereby allowing the connecting member 422 to slide in the through slot 112. In particular, the connecting member 422 is capable of moving from a first position to a second position along the lengthwise direction of the through slot 112. In the embodiment, the first position (shown in FIG. 5) is at one end of the through slot 112 that is nearer to the friction hinge 30, and the second position (shown in FIG. 6) is at the other opposite end of the through slot 112 that is farther away from the friction hinge 30. In FIG. 2, the sliding member 42 is in the first position and the keyboard 20 abuts against the back of the processing portion 10. A corner of the metal housing 22 at a free end of the keyboard 20 is located between an imaginary line A extending along the end of the through slot 112 that is nearer to the friction hinge 30 and an imaginary line B extending along the other opposite end of the through slot 112 that is farther away from the friction hinge 30.

The top of the connecting member 422 defines a receiving slot 424. The magnet 41 is received in the receiving slot 424. In the embodiment, the height of the magnet 41 is greater than the depth of the receiving slot 424. The magnet 41 thus protrudes from the top of the connecting member 422 and slidably abuts against an inner surface of the sidewall 111 of the main housing 11, which helps prevent the sliding member 42 from disengaging from the through slot 112 of the main housing 11.

When the sliding member 42 is moved from the first position to the second position, the attraction force between the magnet 41 and the metal housing 22 becomes smaller than the force of gravity acting on the keyboard 20. Thus in the second position, the sliding member 42 cannot hold the keyboard 20 in position attached to the processing portion 10.

When the keyboard 20 is rotated to abut against to the back of the processing portion 10, and the sliding member 42 is moved from the second position to the first position, the attraction force between the magnet 41 and the metal housing 22 is greater than the force of gravity acting on the keyboard 20. The keyboard 20 is thus held in position attached to the processing portion 10 by the attraction force between the magnet 41 and the metal housing 22.

Although the present disclosure has been specifically described on the basis of the exemplary embodiments thereof, the disclosure is not to be construed as being limited thereto. Various changes or modifications may be made to the embodiments without departing from the scope and spirit of the disclosure.

What is claimed is:

1. A foldable electronic device comprising:
a processing portion comprising a main housing;
a keyboard rotatably connected to the processing portion, and comprising a metal housing; and
at least one latching member arranged in the main housing of the processing portion, and comprising a magnet, wherein when the keyboard abuts against a back of the main housing of the processing portion, an attraction force between the magnet and the metal housing is greater than the force of gravity acting on the keyboard whereby the keyboard is attached to the processing portion.

2. The foldable electronic device as described in claim 1, wherein the at least one latching member is fixed to the main housing.

3. The foldable electronic device as described in claim 1, wherein the main housing of the processing portion defines at least one through slot, the at least one latching member is slidably arranged in the at least one through slot, and the at least one latching member is capable of sliding between a first position and a second position; when the at least one latching member is moved to the first position, the attraction force between the magnet and the metal housing is greater than the force of gravity acting on the keyboard; and when the at least one latching member is moved to the second position, the attraction force between the magnet and the metal housing is smaller than the force of gravity acting on the keyboard.

4. The foldable electronic device as described in claim 3, wherein the at least one latching member further comprises a sliding member, the sliding member is slidably arranged in the at least one through slot, the at least one sliding member defines a receiving slot, and the magnet is fixed in the receiving slot.

5. The foldable electronic device as described in claim 4, wherein a height of the magnet is greater than a depth of the receiving slot, such that the magnet slidably abuts against the main housing.

6. The foldable electronic device as described in claim 4, wherein the at least one sliding member comprises a connecting member, the at least one receiving slot is defined in a top of the connecting member, and the connecting member extends through the at least one through slot of the main housing.

7. The foldable electronic device as described in claim 6, wherein the length of the through slot is greater than the width of the connecting member.

8. The foldable electronic device as described in claim 6, wherein the at least one sliding member further comprises a button, the at least one connecting member extends from the button, and the button is external to the at least through slot of the main housing.

9. A foldable electronic device comprising:
a processing portion comprising a main housing defining at least one through slot;
a keyboard rotatably connected to the processing portion, and comprising a metal housing; and
at least one latching member slidably arranged in the at least one through slot, and comprising a magnet;
wherein the at least one latching member is capable of sliding from a first position to a second position;
when the keyboard abuts against a back of the main housing of the processing portion and the at least one latching member is moved to the first position, the attraction force between the magnet and the metal housing is greater than the force of gravity acting on the keyboard; and
when the at least one latching member is moved to the second position, the attraction force between the magnet and the metal housing is smaller than the force of gravity acting on the keyboard.

10. The foldable electronic device as described in claim 9, wherein the at least one latching member further comprises a sliding member, the sliding member is slidably arranged in the at least one through slot, the at least one sliding member defines a receiving slot, and the magnet is fixed in the receiving slot.

11. The foldable electronic device as described in claim 10, wherein a height of the magnet is greater than a depth of the receiving slot, such that the magnet slidably abuts against the main housing.

12. The foldable electronic device as described in claim 10, wherein the at least one sliding member comprises a connecting member, the at least one receiving slot is defined in the top of the connecting member, and the connecting member extends through the at least one through slot of the main housing.

13. The foldable electronic device as described in claim 12, wherein the length of the through slot is greater than the width of the connecting member.

14. The foldable electronic device as described in claim 12, wherein the at least one sliding member further comprises a button, the at least one connecting member extends from the button, and the button is external to the at least through slot of the main housing.

15. A foldable electronic device comprising:
a processing portion comprising a main housing;
a keyboard rotatably connected to the processing portion, and comprising a metal housing; and
at least one latching member arranged in the main housing of the processing portion, and comprising a magnet, wherein when the keyboard abuts against a back of the main housing of the processing portion, an attraction force between the magnet and the metal housing is greater than the force of gravity acting on the keyboard whereby the keyboard is disengagably attached to the processing portion.

* * * * *